United States Patent
D'Alisa et al.

(10) Patent No.: US 10,937,021 B2
(45) Date of Patent: Mar. 2, 2021

(54) PROPRIETARY TOKEN-BASED UNIVERSAL PAYMENT PROCESSING SYSTEM

(71) Applicants: Albert D'Alisa, Pound Ridge, NY (US); Scott W. Frey, Pound Ridge, NY (US); Frank S. Giaccio, Edwards, CO (US); Greg Hines, Westlake Village, CA (US); Frank Sherman, Agoura Hills, CA (US)

(72) Inventors: Albert D'Alisa, Pound Ridge, NY (US); Scott W. Frey, Pound Ridge, NY (US); Frank S. Giaccio, Edwards, CO (US); Greg Hines, Westlake Village, CA (US); Frank Sherman, Agoura Hills, CA (US)

(73) Assignee: TREC CORPORATION, Cross River, NY (US)

(*) Notice: Subject to any disclaimer, the term of this patent is extended or adjusted under 35 U.S.C. 154(b) by 75 days.

(21) Appl. No.: 14/957,062

(22) Filed: Dec. 2, 2015

(65) Prior Publication Data
US 2016/0253660 A1 Sep. 1, 2016
US 2017/0185997 A9 Jun. 29, 2017

Related U.S. Application Data

(60) Provisional application No. 62/121,526, filed on Feb. 27, 2015, provisional application No. 62/107,191, (Continued)

(51) Int. Cl.
*G06Q 20/36* (2012.01)
*G06Q 20/38* (2012.01)
(Continued)

(52) U.S. Cl.
CPC ......... *G06Q 20/3674* (2013.01); *G06Q 20/02* (2013.01); *G06Q 20/10* (2013.01);
(Continued)

(58) Field of Classification Search
CPC .. G06F 21/34; G06F 21/85; G06F 2221/2113; G06F 2221/2137;
(Continued)

(56) References Cited

U.S. PATENT DOCUMENTS 5,657,390 A   8/1997  Elgamal et al.
8,453,226 B2  5/2013  Hammad
(Continued)

OTHER PUBLICATIONS

"Apple Pay online 2014", 2014 (Year: 2014).*
(Continued)

*Primary Examiner* — Johann Y Choo
(74) *Attorney, Agent, or Firm* — Hunter E. Webb; Keohane & D'Alessandro, PLLC

(57) ABSTRACT

Embodiments described herein provide approaches for processing a payment in an electronic commerce environment. Specifically, a customer of a merchant website in the electronic commerce environment is provided a universal payment interface in response to the customer's request to pay. The universal payment interface retrieves a proprietary token from the customer. This proprietary token is a mobile device-based token that is provided by a provider associated with the mobile device. The universal payment interface requests a determination from the provider as to whether the proprietary token is valid, and the payment is verified based on the determination from the provider.

21 Claims, 8 Drawing Sheets

Related U.S. Application Data filed on Jan. 23, 2015, provisional application No. 62/087,155, filed on Dec. 3, 2014.

(51) Int. Cl.
| | |
|---|---|
| *G06Q 20/02* | (2012.01) |
| *G06Q 20/32* | (2012.01) |
| *G06Q 20/10* | (2012.01) |
| *G06Q 20/40* | (2012.01) |

(52) U.S. Cl.
CPC ....... *G06Q 20/322* (2013.01); *G06Q 20/3278* (2013.01); *G06Q 20/3821* (2013.01); *G06Q 20/38215* (2013.01); *G06Q 20/401* (2013.01)

(58) Field of Classification Search
CPC .......... G06F 3/0412; G06F 21/31; G06F 8/30; G06F 17/243; G06Q 20/38215; G06Q 2220/00; G06Q 20/3823; G06Q 30/0224; G06Q 30/0212; G06Q 20/12; G06Q 30/06; G06Q 30/0241; G06Q 20/085; G06Q 30/0641; G06Q 20/027; G06Q 30/0605; G06Q 20/0855; G06Q 20/3221; G06Q 20/405; G06Q 20/34; G06Q 20/3674; G06Q 10/087; G06Q 10/0833; G06Q 10/0835; G06Q 30/0601; G06Q 40/123; G06Q 20/10

See application file for complete search history.

(56) References Cited

U.S. PATENT DOCUMENTS

| | | | |
|---|---|---|---|
| 8,646,059 B1 | 2/2014 | von Behren et al. | |
| 8,893,967 B2 | 11/2014 | Hammad | |
| 8,949,608 B2 | 2/2015 | Hoornaert et al. | |
| 2002/0087430 A1* | 7/2002 | Davis | G06O 30/0633 705/26.43 |
| 2003/0126036 A1* | 7/2003 | Mascavage, III | G06Q 20/10 705/26.1 |
| 2005/0108104 A1* | 5/2005 | Woo | G06Q 20/12 705/26.41 |
| 2008/0154770 A1 | 6/2008 | Rutherford et al. | |
| 2010/0327054 A1* | 12/2010 | Hammad | G06Q 20/12 235/375 |
| 2012/0221402 A1* | 8/2012 | Brown | G06Q 30/02 705/14.35 |
| 2013/0117185 A1 | 5/2013 | Collison et al. | |
| 2013/0290189 A1* | 10/2013 | Dayalan | G06Q 20/3821 705/44 |
| 2014/0052637 A1 | 2/2014 | Jooste et al. | |
| 2014/0074655 A1 | 3/2014 | Lim et al. | |
| 2014/0122344 A1 | 5/2014 | Foulds et al. | |
| 2014/0143146 A1 | 5/2014 | Passanha et al. | |
| 2014/0297537 A1* | 10/2014 | Kassemi | G06Q 30/0279 705/67 |
| 2015/0012435 A1 | 1/2015 | Ramavarjula et al. | |
| 2015/0095238 A1 | 4/2015 | Khan et al. | |
| 2015/0186871 A1* | 7/2015 | Laracey | G06Q 20/3278 705/41 |

OTHER PUBLICATIONS

Copenheaver, Blaine R., PCT Search Report and Written Opinion, PCT/US2015/063422, dated Feb. 2, 2016, 11 pages.
Hirzallah, Nael et al., "A Mobile Payment System with and Extra Token of Security", International Journal of Computer Engineering and Applications, vol. V, Issue II, Feb. 28, 2014, 13 pages.

\* cited by examiner

Gateway

TRP (Token Receipt Page)

Total Payment Amount $ 86.80 USD

Token Received...

Ship to: Email (optional)
Shipping address:
First name
Last name
Company (optional)
Address
Apt, suite, etc. (optional)
City
United States
State
Zip code
Phone Bill to: Email (optional)
Billing address:
First name
Last name
Company (optional)
Address
Apt, suite, etc. (optional)
City
United States
State
Zip code
Phone Message MESSAGE 304 — *"Token has been received for the following total payment amount, ' 'Ship to'' and ' 'Bill to'' information."

PROPRIETARY TOKEN-BASED UNIVERSAL PAYMENT PROCESSING SYSTEM

TECHNICAL FIELD

The subject matter of this invention relates generally to online payment processing. More specifically, aspects of the present invention provide an approach for utilizing a proprietary payment token as a universal payment vehicle for processing a payment in an electronic commerce environment.

BACKGROUND

In the information technology environment of today, electronic commerce is becoming increasingly important. As more and more computer systems and the connections between them increase in speed and throughput, increasingly more entities are offering their products through online channels. This can provide greatly enhanced access to these products to customers and potential customers, resulting in a larger number of available product offerings to consumers.

One important function of most any electronic commerce system is the ability to process payments. In many conventional payment processing methods, a card holder will be prompted to manually input payment information (e.g., of a credit card). This often takes the form of a user (consumer) inputting various information (e.g., credit card number, expiration date, code, etc.) using an input device, such as a keyboard.

One challenge in electronic commerce payment processing is the prevention of payment information being used by unauthorized personnel (e.g., credit card fraud). This entails a combination of ensuring that the person using the payment information is the person authorized to do so and securing the information being sent so that the information cannot be misappropriated during the transaction. One current solution for providing security includes entities providing a payment gateway for entry of payment information that has a Secure Socket Layer (SSL). SSL provides a layer of encryption while the payment information is being transmitted for verification. Another current solution for providing security includes providing verification through a third party verifier.

SUMMARY

In general, embodiments described herein provide approaches for processing a payment in an electronic commerce environment. Specifically, a customer of a merchant website in the electronic commerce environment is provided a universal payment interface in response to the customer's request to pay. The universal payment interface retrieves a proprietary token from the customer. This proprietary token is a mobile device-based token that is provided by a provider associated with the mobile device. The universal payment interface requests a determination from the provider as to whether the proprietary token is valid, and the payment is verified based on the determination from the provider.

One aspect of the present invention includes a computer-implemented method for processing a payment in an electronic commerce environment, the method comprising: providing a universal payment interface to a customer of a merchant website in the electronic commerce environment in response to a request to pay by a customer; retrieving a proprietary token from the customer by the universal payment interface, the proprietary token being a mobile device-based token that is provided by a provider associated with a mobile device; requesting, by the universal payment interface, a determination from the provider as to whether the proprietary token is valid; and verifying the payment based on the determination from the provider.

Another aspect of the present invention includes a computer system for processing a payment in an electronic commerce environment, the computer system comprising: a memory medium comprising program instructions; a bus coupled to the memory medium; and a processor for executing the program instructions, the instructions causing the system to: provide a universal payment interface to a customer of a merchant website in the electronic commerce environment in response to a request to pay by a customer; retrieve a proprietary token from the customer by the universal payment interface, the proprietary token being a mobile device-based token that is provided by a provider associated with a mobile device; request, by the universal payment interface, a determination from the provider as to whether the proprietary token is valid; and verify the payment based on the determination from the provider.

Yet another aspect of the present invention includes a computer program product for processing a payment in an electronic commerce environment, the computer program product comprising a computer readable storage device, and program instructions stored on the computer readable storage device that, when executed, cause a computer device to: provide a universal payment interface to a customer of a merchant website in the electronic commerce environment in response to a request to pay by a customer; retrieve a proprietary token from the customer by the universal payment interface, the proprietary token being a mobile device-based token that is provided by a provider associated with a mobile device; request, by the universal payment interface, a determination from the provider as to whether the proprietary token is valid; and verify the payment based on the determination from the provider.

BRIEF DESCRIPTION OF THE DRAWINGS

These and other features of this invention will be more readily understood from the following detailed description of the various aspects of the invention taken in conjunction with the accompanying drawings in which:

FIG. 6 depicts an example universal gateway proprietary token receipt page according to illustrative embodiments;

Figure 1:
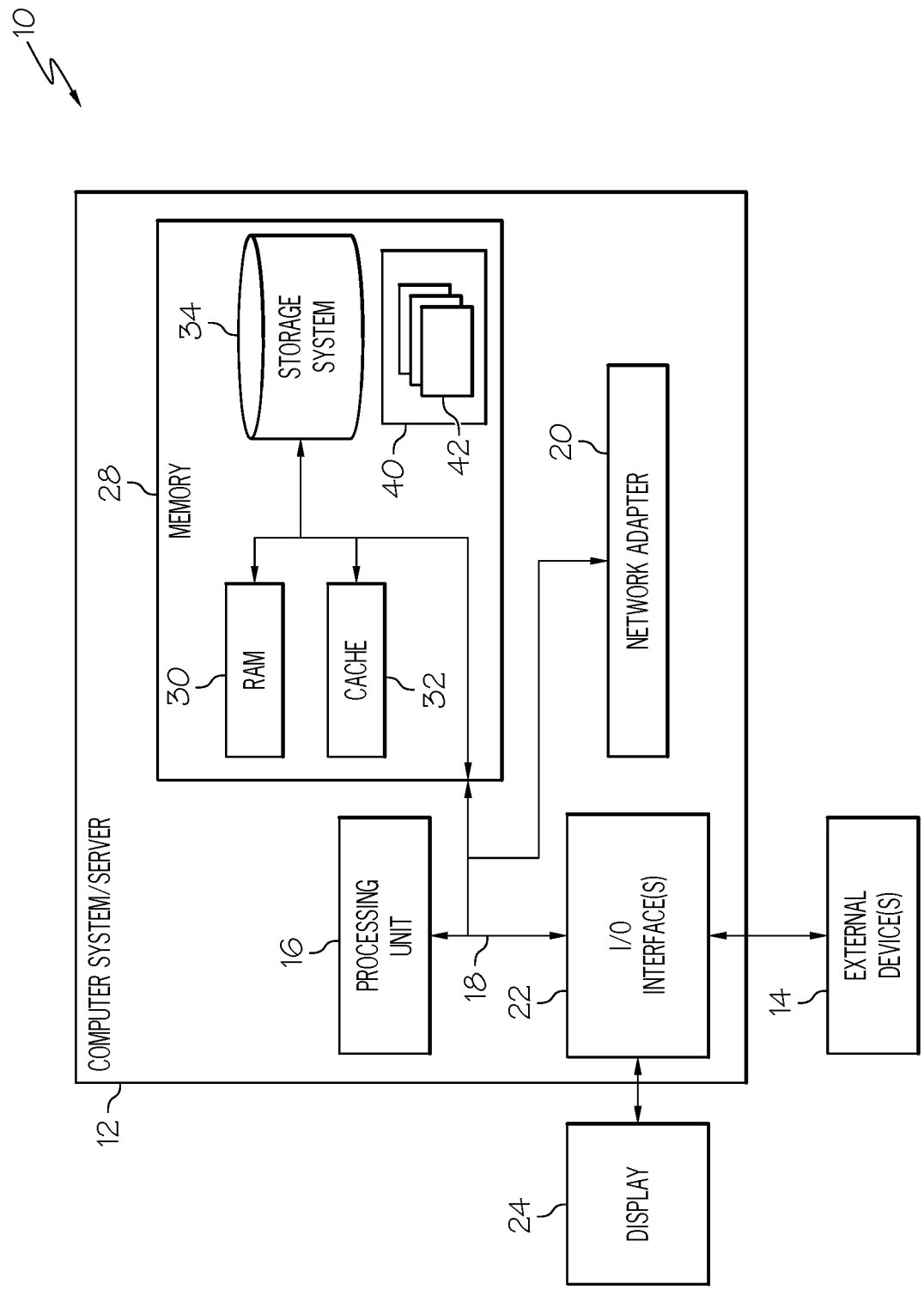
FIG. 1 depicts a block diagram that illustrates a computer implementation in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments described herein provide approaches for processing a payment in an electronic commerce environment. Specifically, a customer of a merchant website in the electronic commerce environment is provided a universal payment interface in response to the customer's request to pay. The universal payment interface retrieves a proprietary token from the customer. This proprietary token is a mobile device-based token that is provided by a provider associated with the mobile device. The universal payment interface requests a determination from the provider as to whether the proprietary token is valid, and the payment is verified based on the determination from the provider.

Referring now to FIG. 1, a computerized implementation 10 of an embodiment for processing a payment in an electronic commerce environment is shown. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and/or distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, and/or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and/or the like, that perform particular tasks or implement particular abstract data types. In this particular example, computer system 12 represents an illustrative system for processing a payment in an electronic commerce environment. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as for processing a payment in an electronic commerce environment, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a consumer to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

Figure 2:
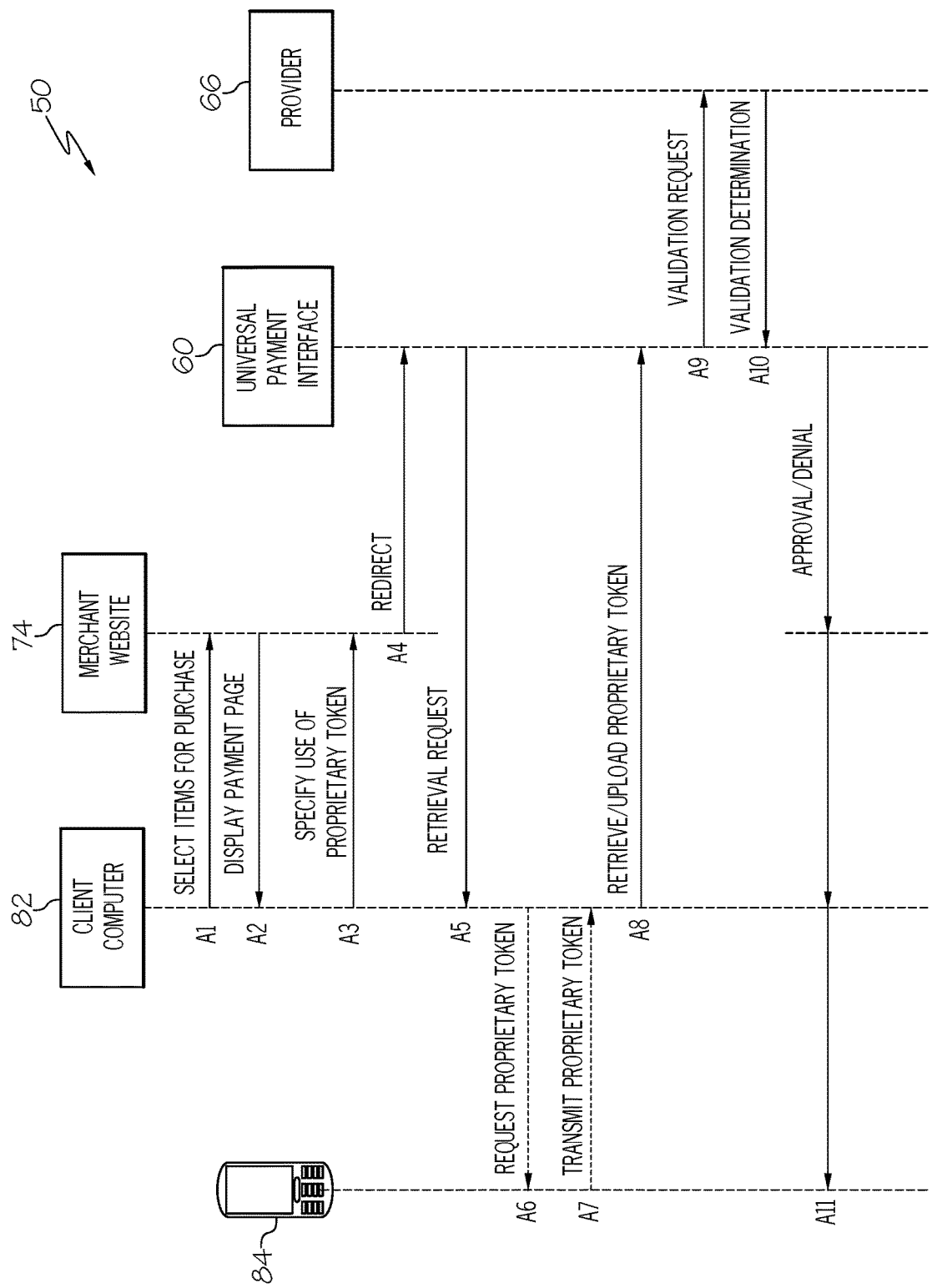
FIG. 2 depicts an example flow diagram according to an embodiment of the present invention.

Referring now to FIG. 2, an example flow diagram 50 according to an embodiment of the present invention is shown. As illustrated, flow diagram 50 shows an example flow among components in embodiments of the present invention.

Figure 3:
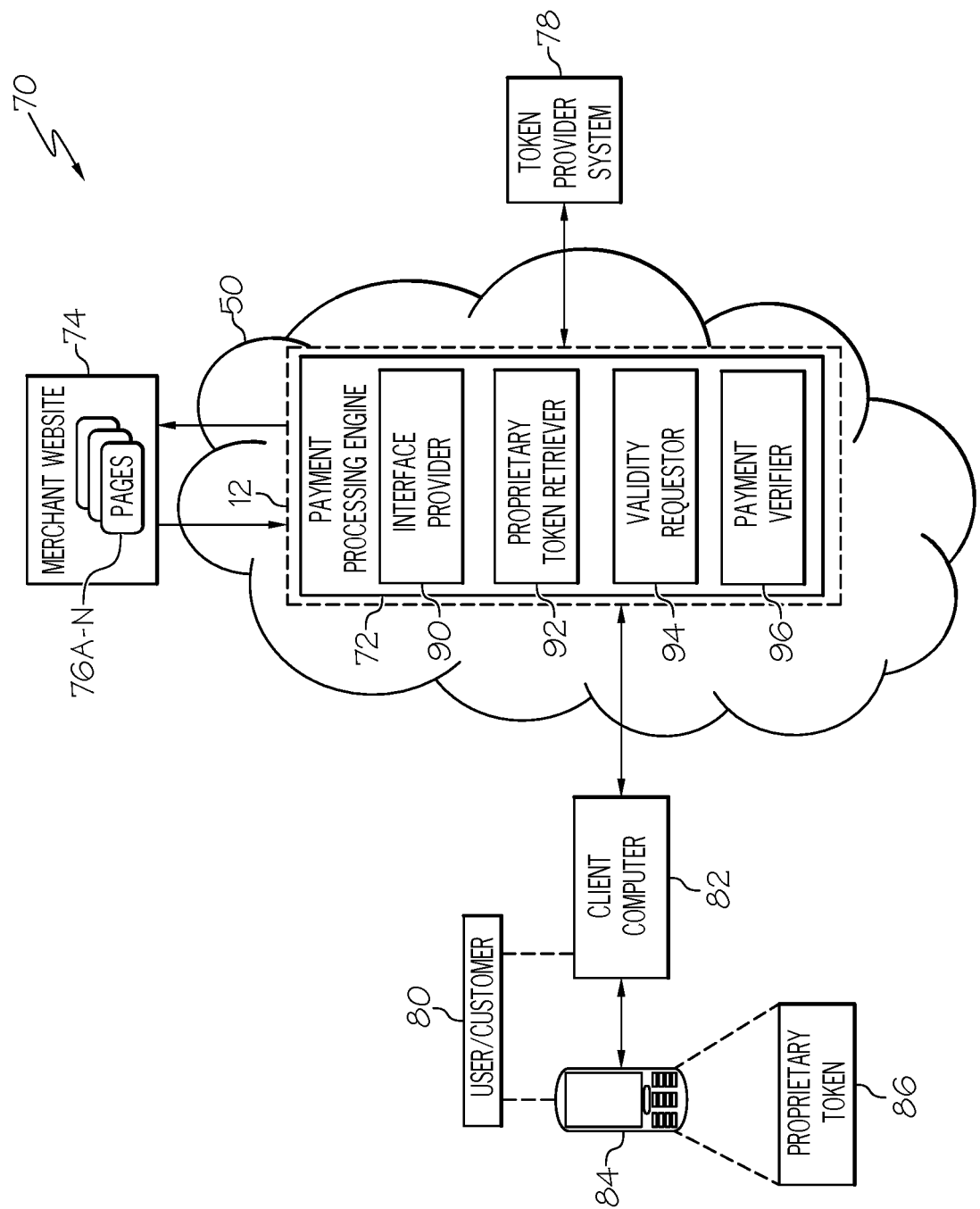
FIG. 3 depicts a system diagram according to an embodiment of the present invention.

Referring now to FIG. 3, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 1 for illustrative purposes only. In the event the teachings recited herein are practiced in a networked computing environment 70, each client computer 82 need not have a payment processing engine (hereinafter "system 72"). Rather, all or part of system 72 could be loaded on a server or server-capable device that communicates (e.g., wirelessly) with the clients to provide device protection therefor. This server or server-capable device could include a system of a merchant 74 in an electronic commerce environment, a token provider system 78, and/or an independently administered system that is separate from merchant website 74 and token provider system 78. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 3 for brevity purposes.

Along these lines, system 72 may perform multiple functions similar to a general-purpose computer. Specifically, among other functions, system 72 can facilitate processing of payments in an electronic commerce environment. To accomplish this, system 72 can include: an interface provider 90, a proprietary token retriever 92, a validity requestor 94, and a payment verifier 96.

Figure 4:
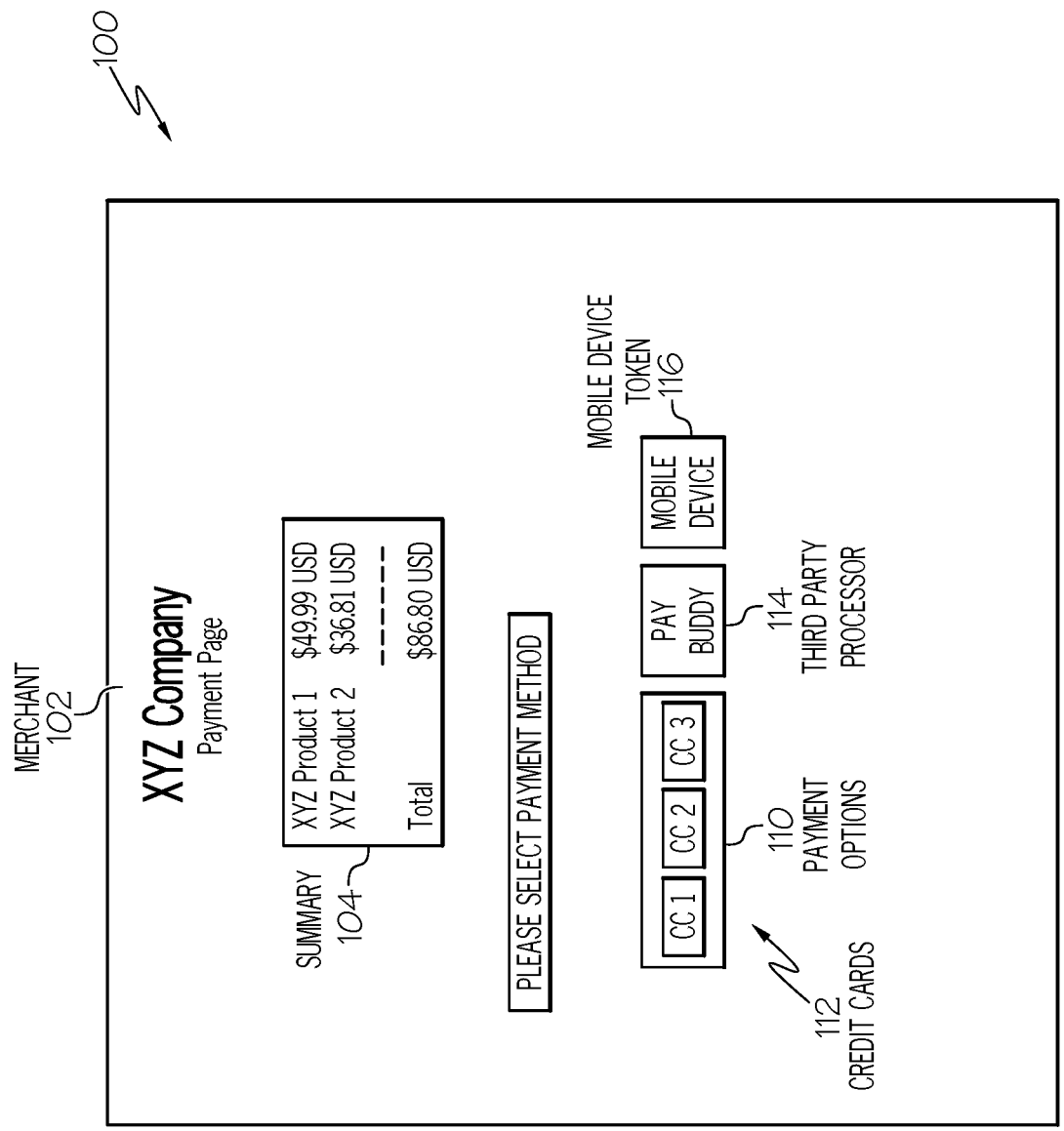
FIG. 4 depicts an example merchant web page according to illustrative embodiments.

Referring now to FIG. 4, an example merchant web page 100 is illustrated according to embodiments of the invention. Referring additionally to FIGS. 2 and 3, merchant web page 100 can be one of a plurality of pages 76A-N on a merchant website 74 in an electronic commerce environment. To this extent, merchant web page 100 can be accessed by a user 80 through networked computing environment 70 using a client computer 82. Client computer 82 can include a personal computer (PC), laptop computer, tablet computer, terminal, and/or the like, running any operating system now known or later developed, including, but not limited to, Microsoft Windows®, Apple®, Unix®-based system, etc. However, it should be understood that client computer 82 is a computer under the control of customer 82 (e.g., belonging to customer 80, used by customer 80 in an employment or similar capacity, and/or the like). To this extent, client computer 82 should not be understood as including a credit card terminal or other computer device that is dedicated to or used by a merchant to process payment transactions at a point of sale. Further, it should be understood that client computer 82 is not meant to include the direct access to merchant website 74 by a mobile device 84 and the direct use of mobile device 84 in to purchase goods and/or services in the electronic commerce environment.

In any case, in an embodiment, customer 80 can access one or more pages 76A-N on merchant website 74 using client computer 82, such as using a web browser installed on client computer. In some cases customer 80 may need to provide user credentials (e.g., to log in using a username, password, and/or the like) in order to access merchant website 74, while in other cases, no login may be required). In any case, customer 80 can navigate through pages 76A-N on merchant website and can select A1 one or more products that customer 80 wishes to purchase. Upon selecting A1, each of the products selected by customer 80 may be placed by merchant cite 74 into a shopping basket, which can aggregate the products that customer 80 wishes to purchase until customer 80 has completed selecting A1 products for purchase. In an alternative embodiment, the selecting A1 of the products can be performed by customer 80 via a voice-based telephonic connection. In this embodiment, customer 80 can provide the selection(s) A1 to a representative, which may be a human representative or an automated interface.

In any case, once customer 80 has completed selecting A1 products for purchase, customer 80 may indicate a readiness to submit payment for the selected items. In response to such an indication, the merchant website 74 may cause a merchant payment page 102 to be displayed A2 to customer 80 on client computer 80. As illustrated, merchant payment page 102 can include a summary 104 of the products that have been selected by customer 80, which may include a description of each of the products and a price associated with each of the products, among other things that have not been illustrated for the sake of brevity, including, but not limited to, tax, shipping, and/or the like. Further, merchant payment page 102 can include one or more payment options 110 from which customer 80 can select for providing payment for the selected products. As shown, the payment options 110 provided by the particular merchant website 74 having the merchant payment page 102 illustrated in FIG. 4 include three credit cards 112. Further, payment options 110 include a third party processor 114. Third party processor 114 is an independent dedicated payment site which allows customer 80 to store payment (e.g., credit card) and to access the site for verification purposes. As also shown, payment options 110 include the use of a mobile device token 116, as will be described in further detail herein. Alternatively, in the case that the selecting A1 of the products is performed by customer 80 via a voice-based telephonic connection, customer 80 can provide the selection of the payment option to the same representative or a different representative, which may be a human representative or an automated interface.

The inventors of the invention described herein have discovered certain deficiencies in current solutions for processing payments in an electronic commerce environment. For example, if customer 80 chooses to select payment by credit card 112, customer 80 conventionally is required to manually input his/her card information within a payment box on an SSL payment page. Customer 80 would normally key in a credit card number and other information into fields on the merchant payment page 102 from a keyboard at the client computer 82. Similarly, if customer 80 chooses to select payment by third party processor 114, customer 80 would normally be required to key in or select credit card information on the website of the third party processor 114. However, these solutions for entry/selection of credit card information can leave the information vulnerable to credit card fraud. For example, because possession of the physical card is not required, anyone who possesses the card information can use the information to make purchases. Further, the information that is entered or selected using these solutions is vulnerable to theft during data entry (e.g., via a key logger program) or transfer (e.g., via a man-in-the-middle type attack) and used in a fraudulent transaction. Further, these solutions require the use of secure sockets layer (SSL) type encryption, adding cost and complexity to the systems.

Referring again to FIGS. 1-3, interface provider 90 of system 72, as executed by computer system/server 12, is configured to provide A4 a universal payment interface 60 to customer 80 of merchant website 74 in the electronic commerce environment. The universal payment interface 60 provided by interface provider 90 can be provided A4 in response to a request to pay by customer 80.

For example, in an embodiment, interface provider 90 can provide a link to the universal payment interface 60 on merchant website 74 (e.g., on merchant payment page 102). As illustrated in FIG. 4, this link can include a mobile device token 116 option that can be selected by customer 80 from among a plurality of payment options 110 on merchant payment page 102. Customer 80 would be redirected to a remote server having universal payment interface 60 in response to a selection of the link by customer 80.

In an alternative embodiment, universal payment interface 60 can be integrated into merchant website 74. In this embodiment, universal payment interface 60 may be the sole option provided to customer 80 for processing payment. In this case, universal payment interface 60 may be provided directly to customer 80 by merchant website 74 in response to the request to pay by customer 80. Alternatively, universal payment interface 60 may be one of a plurality of payment options 110 integrated into merchant website 74 and available for selection by customer 80.

In an alternative embodiment, universal payment interface 60 can reside on client computer 82. In this embodiment, universal payment interface 60 may be integrated into an application, such as a browser application; activated as a plugin to the browser application; or executed as a stand-alone application on client computer 82. Whatever the case, universal payment interface 60 on client computer 82 can be provided to customer 80 in response to the request to pay by customer 80 that is communicated to the client computer.

In the alternative embodiment, in which the voice-based telephonic connection is used, the same representative or a different representative, which may be a human representative or an automated interface, can provide customer 80 with a code in response to an indication that customer 80 is ready to pay. This provided code would be uniquely associated with the transaction that the user is performing over the voice-based telephonic connection in the electronic commerce environment. In this case, universal payment interface 60 may be provided to customer 80 upon entry of the code by customer 80 into a website (e.g., a portion of merchant website 74 communicated to customer 80 by the representative over the voice-based telephonic connection, or the like) using client computer 82. To this extent, the code could be any combination of numeric or alphanumeric characters, symbols, or the like, that can be entered onto a website using any solution now known or later developed.

Referring again to FIGS. 1-3, proprietary token retriever 92 of system 72, as executed by computer system/server 12, is configured to retrieve A8 a proprietary token 86 from customer 80 by the universal payment interface. Proprietary token 86 is a mobile device-based token that is provided by a provider 66 associated with mobile device 84. This provider 66 of proprietary token 86 can include a provider of the hardware of the mobile device 84, a provider of the operating system of the mobile device, a provider of a modification to the operating system of the mobile device 84, and/or the like. To this extent, proprietary token 86 is typically tied to mobile device 84 such that proprietary token 86 has, to date, only been used in conjunction with mobile device 84 (e.g., for purchases made on the mobile device 84 itself, for purchases made by physically presenting the mobile device 84 at a payment terminal, or the like). Examples of such proprietary token 86 include, but are not limited to, an Apple Pay® token (Apple Pay is a registered trademark of Apple Computer, Inc.), a Samsung Pay® token (Samsung Pay is a registered trademark of Samsung, Inc.), a Google Wallet® token (Goggle Wallet is a registered trademark of Google, Inc.), and/or the like.

In any case, proprietary token 86 is a package that includes payment information (e.g., credit card information) of a user 80 of mobile device 84. This information is encrypted within proprietary token 86. Further, a different proprietary token 86 can be generated for each payment transaction by the provider, the mobile device 84, or a combination of the two. This allows the proprietary token 86 to be extremely secure, as the credit card information belonging to the user 80 is never transmitted in clear text or found in clear text on the mobile device 80. In an embodiment, proprietary token 86 can include a unique number that may have the same number of digits as the payment type (e.g., credit card, debit card, or similar financial bank card data) that corresponds to the proprietary token 86. This unique number can be generated algorithmically, randomly, using encryption, or using any solution now known or later developed. Further, this unique number may have the same final four numbers as the payment type from which the unique number was generated. Further, proprietary token 86 can also include additional elements including, but not limited to, an expiration date, a credit verification value (CVV) code, biometric data, unique information related to the mobile device 84, or the like, which can be encrypted within a cryptogram, or the like. However, these examples should not be seen as limiting. Rather, proprietary token 86 can include any payment information associated with a mobile device 84 that is now known or later developed, including, but not limited to, a payment token or an alternative number as representative of said payment token or a temporary replacement of a bank card number, or the like.

Figure 5:
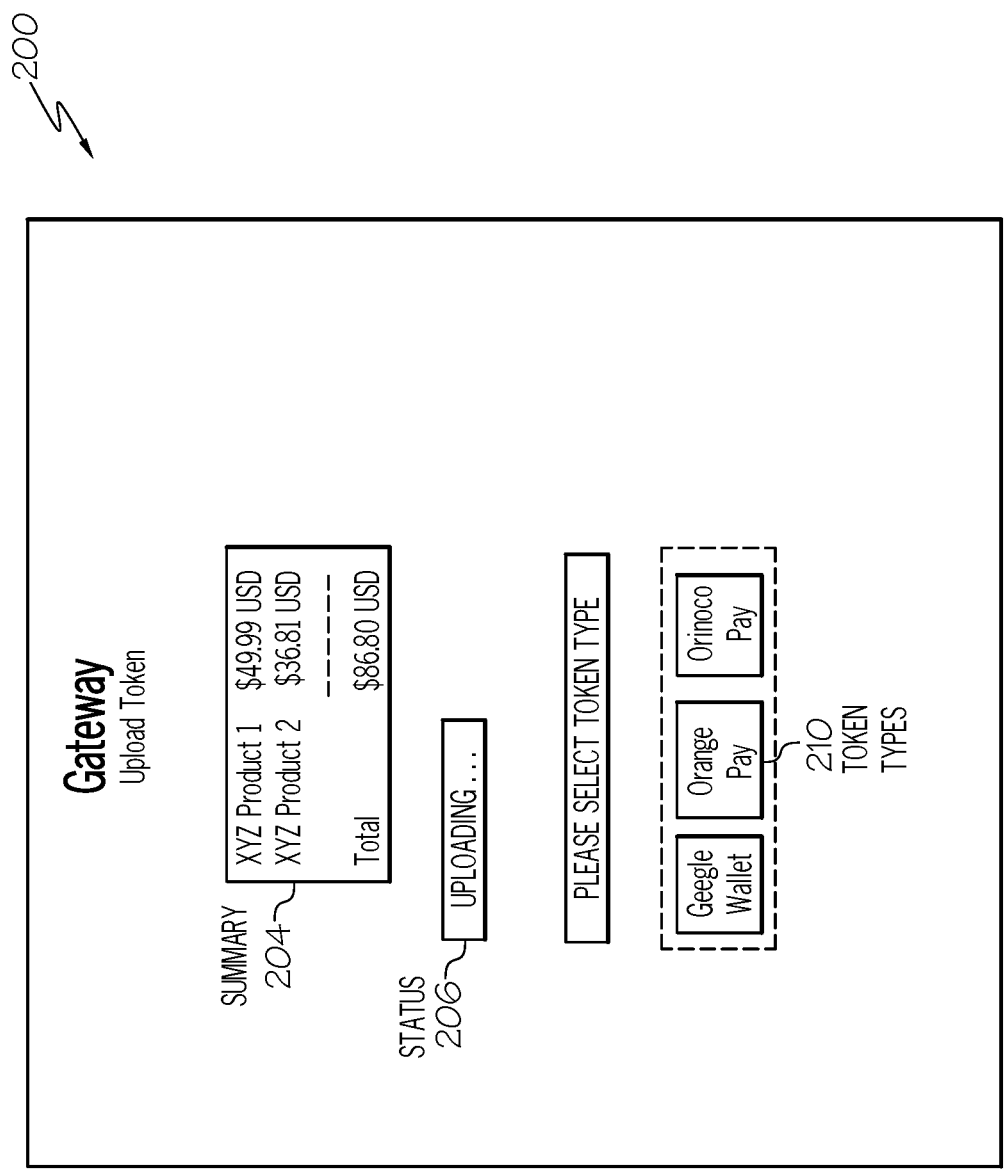
FIG. 5 depicts an example universal gateway proprietary token retrieval page according to illustrative embodiments.

Referring now to FIG. 5, an example universal gateway proprietary token retrieval page 200 is shown according to illustrative embodiments. As illustrated, universal gateway proprietary token retrieval page 200 includes a summary 204 of the transaction being processed and a status indicator 206 that indicates a status of the retrieval of proprietary token 86 from mobile device 84 via client computer 82. In an embodiment, universal gateway proprietary token retrieval page 200 can also include a set of token types 210 that the customer can select from.

Referring now to FIG. 5, in conjunction with FIGS. 2-4, proprietary token retriever 92 can initiate retrieval of proprietary token 86 by downloading a retrieval request A5 to client computer 82. As shown, in FIG. 5, during retrieval request A5, status indicator 206 may display a status of "Requesting Token" to customer 80. In an embodiment, retrieval request A5 can be initiated in response to a selection by customer 80 of a token type 210 to be retrieved. Alternatively, retrieval request A5 can be downloaded in response to a "ready" indication by customer 80 or directly in response to the providing of the universal payment interface. In such a case, the resulting proprietary token 86 can be analyzed by the universal payment system to determine the provider of the proprietary token 86.

Whatever the case, retrieval request A5 downloaded to client computer 82 from proprietary token retriever 92 causes the client computer to retrieve A7 proprietary token 86 from mobile device 84 of customer 80. To this extent, mobile device 84 can be a smartphone, a tablet, a personal digital assistant (PDA), a smart watch, a personal music device, a smart wristband, a smart free on board (fob), a smart sticker, smart clothing or any other computerized device now known or later developed that can have a proprietary token 86 associated therewith. In any case, in an embodiment, the retrieval A7 of proprietary token 86 can be performed via a physical (e.g., wired) connection between mobile device 84 and client computer 82. This physical connection can take the form of a universal serial bus (USB) cable, a Firewire connection, a docking station, direct serial or parallel connections, or any other solution now known or later developed for facilitating a transfer of information via a physical connection between a mobile device 84 to a client computer 82.

Additionally or in the alternative, the retrieval A7 of proprietary token 86 can be performed over a distance via a wireless connection between mobile device 84 and client computer 82. This wireless connection can be established directly in response to the receipt of the retrieval request A5 by client computer 82, or, alternatively, an instruction for initiating the retrieval process can be transmitted to the user 80. For example, the user 80 may be instructed to pass the mobile device 84 over or within a certain proximity of client computer 82. Subsequently, when client computer 82 detects the presence of mobile device 84 (e.g., via a video capture device, a signal strength detector, a motion detector, or the like), client computer 82 can establish A6 the wireless connection. In an embodiment, this wireless connection may use a Bluetooth® protocol (Bluetooth is a registered trademark of Bluetooth Special Interest Group (SIG)). Alternatively, other remote connection and/or wireless communications protocols can be utilized including, but not limited to, infrared, wireless fidelity (Wi-Fi), near field communications (NFC), radio, microwave, short wave, cellular, satellite, and/or any other type of communications protocol that can be used to establish A6 communications between client computer 82 and a mobile device 114.

In any case, once the client computer 82 has retrieved A7 proprietary token 86 from mobile device 84, the client computer 82 uploads A8 the retrieved proprietary token 86 to the universal payment interface. As shown in FIG. 5, during this upload A8, status indicator 206 may display a status of "Uploading". This upload A8 can be performed using the same communications channel that customer 80 has previously been using to communicate with merchant website 74 or, alternatively, a secondary and/or dedicated communication channel can be used. However, because proprietary token 86 is being used, and due to the security features inherent in a proprietary token 86, no further encryption or security is necessary when performing the upload. To this extent, a customer's 80 payment information can be provided without the need for creating a SSL, separate portal, or any other type of encryption/security.

Figure 7:
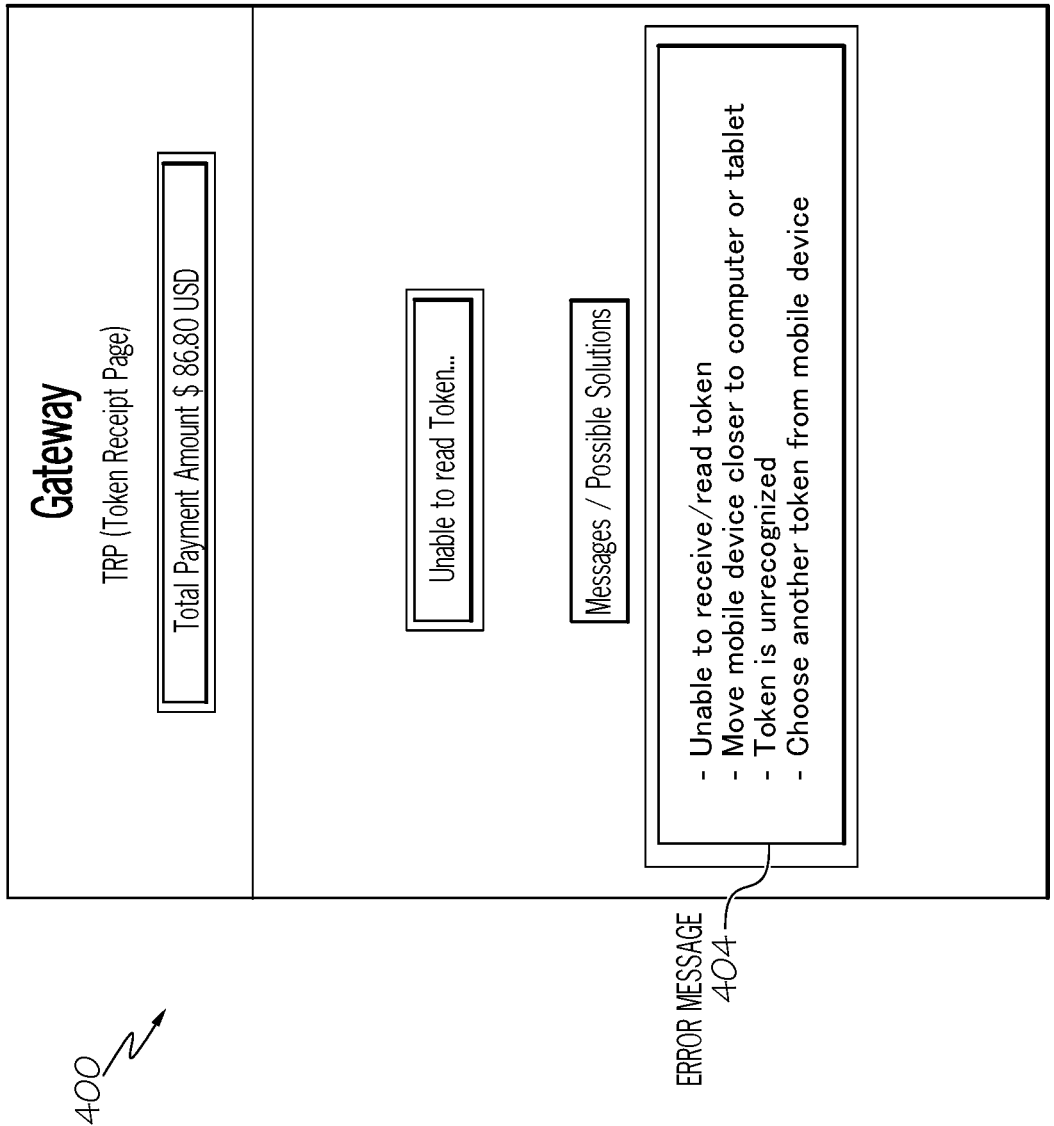
FIG. 7 depicts an example universal gateway proprietary token receipt error page according to illustrative embodiments.

Referring now to FIGS. 6 and 7, a pair of web pages 300 and 400 illustrating possible responses to attempts by the universal payment interface to retrieve proprietary token 86 (FIG. 3) are illustrated according to embodiments of the invention. As illustrated, FIG. 6 shows a universal gateway proprietary token receipt page 300 ("receipt page") that indicates that proprietary token 86 (FIG. 3) of customer 80 (FIG. 3) has been retrieved A8 for processing payment. Receipt page 300 may include a message 304 that alerts customer 80 that the token has been received and provides any information that might be considered pertinent to the transaction. Conversely, FIG. 7 shows a universal proprietary token receipt error page 400, that indicates that the retrieval A8 of proprietary token 86 (FIG. 3) of customer 80 (FIG. 3) was unsuccessful. Error page 400 can also include an error message 404 that indicates why the token was not retrieved (e.g., process timeout, transmission error, unrecognizable token, etc.) and/or possible solutions for resolving the error (e.g., moving mobile device 84 nearer to client computer 82, using a different proprietary token 86, etc.). Further, error page 400 may include tools to redirect customer 80 to alternative payment types in response to one or more failures.

Referring again to FIGS. 2 and 3, validity requestor 94 of system 72, as executed by computer system/server 12, is configured to request A9 a determination from the provider (e.g., token provider system 78) as to whether the retrieved A8 proprietary token 86 is valid. For example, the retrieved A8 proprietary token 86 can be forwarded A9 by the universal payment interface to token provider system 78, and is operated by the provider of the proprietary token 86 to the mobile device 84. The propriety token 86 contains information that enables the provider to retrieve credit card information associated with customer 80. For example, in an embodiment (e.g., in which proprietary token 86 includes a unique number that is randomly generated or the like), token provider system 78 may have a mapping table that is used to retrieve the original credit card number from the unique number in proprietary token 86. Further, provider system 78 has the encryption keys to decode any information contained in a cryptogram, or the like. Thus, the provider system 78 can read the information in the proprietary token 86 to determine whether the proprietary token 86 is a valid proprietary token 86 (e.g., not copied, counterfeit, etc.) and can send the credit card information located in the proprietary token 86 to the servicer (e.g., merchant processor, issuing bank, credit card company, etc.) for processing. Based on the information, the servicer can return an indication as to whether the transaction has been approved or whether the transaction has been denied.

Payment verifier 96 of system 72, as executed by computer system/server 12, is configured to verify A11 the payment based on the determination A10 from the provider (e.g., token provider system 78). For example, in cases in which the proprietary token 86 was declined, an indication as to the reason (e.g., insufficient funds, unreadable proprietary token 86, etc.) the proprietary token 86 was declined may be provided (e.g., as an error code, message, etc.). Conversely, if the proprietary token 86 was approved, the transaction is complete, and the products that were purchased can be shipped or otherwise provided to customer 80. The universal payment interface can provide an indication of the determination to the merchant website 74 and/or may redirect customer 80 to the merchant website 74 at the completion of the transaction.

Figure 8:
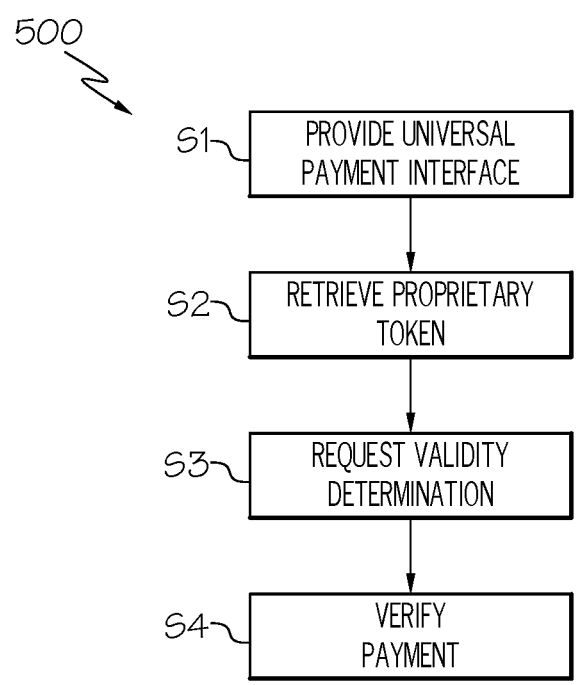
FIG. 8 depicts a process flowchart according to illustrative embodiments.

Referring now to FIG. 8 in conjunction with FIGS. 1-4, a method flowchart 500 according to an embodiment of the present invention is shown. At S1, interface provider 90 of system 72, as executed by computer system/server 12, provides a universal payment interface to a customer 80 of a merchant website 74 in the electronic commerce environment. This universal payment interface can be provided in response to a request to pay by the customer 80. At S2, proprietary token retriever 92 retrieves a proprietary token 86 from customer 80 by the universal payment interface. At S3, validity requestor 94 requests a determination from the provider of proprietary token 86 as to whether the proprietary token 86 is valid. This determination is requested by the universal payment interface. At S4, payment verifier 96 of system 72, as executed by computer system/server 12, verifies the payment based on the determination from the provider.

Process flowchart 500 of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for processing a payment in an electronic commerce environment. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for processing a payment in an electronic commerce environment. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (i.e., the Internet, a local area network, a wide area network and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for processing a payment in an electronic commerce environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for processing a payment in an electronic commerce environment, the method comprising:

receiving, from an internet browser on a client computer used by a customer, a selection of a payment option requiring proprietary tokens from among a plurality of payment options selectable on a first merchant website associated with a first merchant in the electronic commerce environment in response to a request to pay by the customer;

providing a universal payment interface to the internet browser of the client computer used by the customer of the first merchant website associated with a first merchant in the electronic commerce environment in response to the selection of the payment option requiring proprietary tokens, the universal payment interface being a third-party interface on a separate server from the first merchant website;

receiving, from the internet browser on the client computer used by the customer, a selection of a payment option requiring a proprietary token from among a plurality of payment options requiring proprietary tokens selectable on the universal payment interface;

downloading from the universal payment interface a retrieval request for the proprietary token corresponding to the payment option selected by the customer to the internet browser of the client computer being used by the customer to access the first merchant website;

establishing, by the internet browser of the client computer in response to a receipt of the retrieval request at the client computer, a wireless connection between the client computer and a mobile device of the customer;

forwarding, by the internet browser of the client computer in response to the receipt of the establishing of the wireless connection, the retrieval request by the client computer to the mobile device of the customer via the wireless connection;

transferring, by the internet browser of the client computer in response to a receipt of the retrieval request at the mobile device the proprietary token stored on a mobile device of the customer from the mobile device to the client computer via the wireless connection, wherein the client computer and the mobile device are each operated separately from the separate server;

receiving, at the internet browser, an indication of whether a retrieval of the proprietary token was successful;

communicating to the user, in response to a receipt at the internet browser of an indication that a retrieval of the proprietary token was unsuccessful, an indication of why the proprietary token was not received and a set of possible solutions for resolving the error, wherein the indication of why the proprietary token was not received is selected from a group, consisting of: process timeout, transmission error, and unrecognizable token, and wherein the set of possible solutions is selected from a group, consisting of: moving the mobile device nearer to the client computer, and using a different proprietary token;

transmitting, by the internet browser of the client computer, the proprietary token electronically over a network by the universal payment interface, the proprietary token being a mobile device-based token that is proprietary to the mobile device and provided to the mobile device by a provider of the mobile device prior to the request to pay, the provider being at least one of a manufacturer of a hardware of the mobile device or a developer of an operating system of the mobile device and being independent of the first merchant and the universal payment interface;

requesting, by the universal payment interface in response to the retrieving of the proprietary token, a determination from the provider as to whether the proprietary token is valid; and verifying the payment based on the determination from the provider.

2. The method of claim 1, further comprising:

providing a link to the universal payment interface on the merchant website in the electronic commerce environment; and redirecting the customer to the universal payment interface in response to a selection of the link by the customer.

3. The method of claim 1, wherein the wireless connection uses at least one of a Bluetooth protocol or Wi-Fi.

4. The method of claim 1, wherein the propriety token contains information that enables the provider to retrieve credit card information associated with the customer.

5. The method of claim 1, wherein the propriety token is at least one of an Apple Pay token, a Samsung Pay token, or a Google Wallet token.

6. The method of claim 1, further comprising:
providing a code that is uniquely associated with a transaction in the electronic commerce environment to the customer via a voice-based telephonic connection; and
redirecting the customer to the universal payment interface in response to an entry of the code into a website by the user.

7. The computer system of claim 6, wherein the wireless connection uses at least one of a Bluetooth protocol or Wi-Fi.

8. The method of claim 1, further comprising:
providing the universal payment interface to a second customer of a second merchant website associated with a second merchant that is not affiliated with the first merchant in the electronic commerce environment in response to a request to pay by the second customer, the second merchant being independent of the provider and the universal payment interface;
retrieving a second proprietary token from the second customer electronically over the network by the universal payment interface;
requesting, by the universal payment interface in response to the retrieving of the second proprietary token, a determination from the provider as to whether the second proprietary token is valid; and
verifying a second payment based on the determination from the provider.

9. A computer system for processing a payment in an electronic commerce environment, the computer system comprising:
a memory medium comprising program instructions;
a bus coupled to the memory medium; and
a processor for executing the program instructions, the instructions causing the system to:
receive, from an internet browser on a client computer used by a customer, a selection of a payment option requiring proprietary tokens from among a plurality of payment options selectable on a first merchant website associated with a first merchant in the electronic commerce environment in response to a request to pay by the customer;
provide a universal payment interface to the internet browser of the client computer used by the customer of the first merchant website associated with a first merchant in the electronic commerce environment in response to the selection of the payment option requiring proprietary tokens, the universal payment interface being a third-party interface on a separate server from the first merchant website;
receive, from the internet browser on the client computer used by the customer, a selection of a payment option requiring a proprietary token from among a plurality of payment options requiring proprietary tokens selectable on the universal payment interface;
download from the universal payment interface a retrieval request for the proprietary token corresponding to the payment option selected by the customer to the internet browser of the client computer being used by the customer to access the first merchant website;
establish, by the internet browser of the client computer in response to a receipt of the retrieval request at the client computer, a wireless connection between the client computer and a mobile device of the customer;
transmit, by the internet browser of the client computer in response to a receipt of the retrieval request at the mobile device the proprietary token stored on a mobile device of the customer from the mobile device to the client computer via the wireless connection, wherein the client computer and the mobile device are each operated separately from the separate server;
receive, at the internet browser, an indication of whether a retrieval of the proprietary token was successful;
communicate to the user, in response to a receipt at the internet browser of an indication that a retrieval of the proprietary token was unsuccessful, an indication of why the proprietary token was not received and a set of possible solutions for resolving the error, wherein the indication of why the proprietary token was not received is selected from a group, consisting of: process timeout, transmission error, and unrecognizable token, and wherein the set of possible solutions is selected from a group, consisting of: moving the mobile device nearer to the client computer, and using a different proprietary token;
transmit, by the internet browser of the client computer, electronically over a network by the universal payment interface, the proprietary token being a mobile device-based token that is proprietary to the mobile device and provided to the mobile device by a provider of the mobile device prior to the request to pay, the provider being at least one of a manufacturer of a hardware of the mobile device or a developer of an operating system of the mobile device and being independent of the first merchant and the universal payment interface;
request, by the universal payment interface in response to the retrieving of the proprietary token, a determination from the provider as to whether the proprietary token is valid; and
verify the payment based on the determination from the provider.

10. The computer system of claim 9, the instructions further causing the system to:
provide a link to the universal payment interface on the merchant website in the electronic commerce environment; and
redirect the customer to the universal payment interface in response to a selection of the link by the customer.

11. The computer system of claim 9, wherein the propriety token contains information that enables the provider to retrieve credit card information associated with the customer.

12. The computer system of claim 9, wherein the propriety token is at least one of an Apple Pay token, a Samsung Pay token, or a Google Wallet token.

13. The system of claim 9, the instructions further causing the system to:
provide a code that is uniquely associated with a transaction in the electronic commerce environment to the customer via a voice-based telephonic connection; and
redirect the customer to the universal payment interface in response to an entry of the code into a website by the customer.

14. The system of claim 9, the instructions further causing the system to:
provide the universal payment interface to a second customer of a second merchant website associated with a second merchant that is not affiliated with the first merchant in the electronic commerce environment in response to a request to pay by the a second customer, the second merchant being independent of the provider and the universal payment interface;
retrieve a second proprietary token from the second customer electronically over the network by the universal payment interface;
request, by the universal payment interface in response to the retrieving of the second proprietary token, a determination from the provider as to whether the second proprietary token is valid; and
verify a second payment based on the determination from the provider.

15. A computer readable storage device having a computer program product for processing a payment in an electronic commerce environment stored thereon, the computer program product comprising program instructions stored on the computer readable storage device that, when executed, cause a computer device to:
receive, from an internet browser on a client computer used by a customer, a selection of a payment option requiring proprietary tokens from among a plurality of payment options selectable on a first merchant website associated with a first merchant in the electronic commerce environment in response to a request to pay by the customer;
provide a universal payment interface to the internet browser of the client computer used by the customer of the first merchant website associated with a first merchant in the electronic commerce environment in response to the selection of the payment option requiring proprietary tokens, the universal payment interface being a third-party interface on a separate server from the first merchant website;
receive, from the internet browser on the client computer used by the customer, a selection of a payment option requiring a proprietary token from among a plurality of payment options requiring proprietary tokens selectable on the universal payment interface;
download from the universal payment interface a retrieval request for the proprietary token corresponding to the payment option selected by the customer to the internet browser of the client computer being used by the customer to access the first merchant website;
establish, by the internet browser of the client computer in response to a receipt of the retrieval request at the client computer, a wireless connection between the client computer and a mobile device of the customer;
transfer, by the internet browser of the client computer in response to a receipt of the retrieval request at the mobile device the proprietary token stored on a mobile device of the customer from the mobile device to the client computer via the wireless connection, wherein the client computer and the mobile device are each operated separately from the separate server;
receive, at the internet browser, an indication of whether a retrieval of the proprietary token was successful;
communicate to the user, in response to a receipt at the internet browser of an indication that a retrieval of the proprietary token was unsuccessful, an indication of why the proprietary token was not received and a set of possible solutions for resolving the error, wherein the indication of why the proprietary token was not received is selected from a group, consisting of: process timeout, transmission error, and unrecognizable token, and wherein the set of possible solutions is selected from a group, consisting of: moving the mobile device nearer to the client computer, and using a different proprietary token;
transmit, by the internet browser of the client computer, the proprietary token electronically over a network by the universal payment interface, the proprietary token being a mobile device-based token that is proprietary to the mobile device and provided to the mobile device by a provider of the mobile device prior to the request to pay, the provider being at least one of a manufacturer of a hardware of the mobile device or a developer of an operating system of the mobile device and being independent of the first merchant and the universal payment interface;
request, by the universal payment interface, a determination from the provider as to whether the proprietary token is valid; and
verify the payment based on the determination from the provider.

16. The computer program product of claim 15, the program instructions further causing the computer device to:
provide a link to the universal payment interface on the merchant website in the electronic commerce environment; and
redirect the customer to the universal payment interface in response to a selection of the link by the customer.

17. The computer program product of claim 15, wherein the wireless connection uses at least one of a Bluetooth protocol or Wi-Fi.

18. The computer program product of claim 15, wherein the propriety token contains information that enables the provider to retrieve credit card information associated with the customer.

19. The computer program product of claim 15, wherein the propriety token is at least one of an Apple Pay token, a Samsung Pay token, or a Google Wallet token.

20. The computer program product of claim 15, the program instructions further causing the computer device to:
provide a code that is uniquely associated with a transaction in the electronic commerce environment to the customer via a voice-based telephonic connection; and
redirect the customer to the universal payment interface in response to an entry of the code into a website by the user.

21. The computer program product of claim 15, the program instructions further causing the computer device to:
provide the universal payment interface to a second customer of a second merchant website associated with a second merchant that is not affiliated with the first merchant in the electronic commerce environment in response to a request to pay by the second customer, the second merchant being independent of the provider and the universal payment interface;
retrieve a second proprietary token from the second customer electronically over the network by the universal payment interface;
request, by the universal payment interface in response to the retrieving of the second proprietary token, a determination from the provider as to whether the second proprietary token is valid; and verify a second payment based on the determination from the provider.

\* \* \* \* \*